US009363482B2

(12) United States Patent
Hunacek et al.

(10) Patent No.: US 9,363,482 B2
(45) Date of Patent: Jun. 7, 2016

(54) METHOD TO ENFORCE WATERMARKING INSTRUCTIONS IN A RECEIVING DEVICE

(71) Applicant: Nagravision S.A., Cheseaux-sur-Lausanne (CH)

(72) Inventors: Didier Hunacek, Blonay (CH); Patrick Servet, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 11 days.

(21) Appl. No.: 14/134,687

(22) Filed: Dec. 19, 2013

(65) Prior Publication Data

US 2014/0177834 A1 Jun. 26, 2014

Related U.S. Application Data

(60) Provisional application No. 61/740,480, filed on Dec. 21, 2012.

(30) Foreign Application Priority Data

Dec. 21, 2012 (EP) .................................... 12199137

(51) Int. Cl.
*H04N 7/167* (2011.01)
*H04N 21/4405* (2011.01)
(Continued)

(52) U.S. Cl.
CPC ......... *H04N 7/1675* (2013.01); *H04N 21/4405* (2013.01); *H04N 21/63345* (2013.01); *H04N 21/8355* (2013.01); *H04N 21/8358* (2013.01)

(58) Field of Classification Search
CPC .................................................... H04N 7/1675

USPC ......................................................... 380/205
See application file for complete search history.

(56) References Cited

U.S. PATENT DOCUMENTS 6,834,110 B1 * 12/2004 Marconcini .......... G06Q 20/382
380/239
6,885,748 B1 * 4/2005 Wang ..................... G06F 21/10
380/201

(Continued)

FOREIGN PATENT DOCUMENTS

EP 1968316 A1 9/2008
EP 2204979 A1 7/2010
(Continued)

OTHER PUBLICATIONS

G. Voyatzis; The use of WaterMarks in the protection of degital multimedia; year:1999; IEEE; p. 1-33.*

(Continued)

*Primary Examiner* — Monjour Rahim
(74) *Attorney, Agent, or Firm* — Harness, Dickey & Pierce, P.L.C.

(57) ABSTRACT

A method to enforce watermarking instructions by a security module in a receiving device, comprising the steps of receiving a security message by—a security module, comprising at least a content key, watermark instructions and security message signature, said watermark instruction activates or deactivates a watermarking module, decrypting—a security message with a transmission key, verifying—a security message signature, and in case of successful verification, reading a watermarking data from the watermarking module, verifying the authenticity of the watermarking data, and in case of successful verification, transmitting the watermark instructions to the watermark module and the content key to a descrambling module.

12 Claims, 5 Drawing Sheets

(51) Int. Cl.
*H04N 21/6334* (2011.01)
*H04N 21/8355* (2011.01)
*H04N 21/8358* (2011.01)

(56) References Cited

U.S. PATENT DOCUMENTS

| | | | | |
|---|---|---|---|---|
| 7,536,026 | B2* | 5/2009 | Kaneda | G06T 1/0028 340/5.86 |
| 2002/0133705 | A1* | 9/2002 | Tagashira | G11B 20/00086 713/176 |
| 2002/0188841 | A1* | 12/2002 | Jones | G06F 17/30876 713/153 |
| 2003/0072467 | A1* | 4/2003 | Brundage | G06T 1/005 382/100 |
| 2003/0103645 | A1* | 6/2003 | Levy | G06F 17/30876 382/100 |
| 2003/0105718 | A1* | 6/2003 | Hurtado | G06F 21/10 705/51 |
| 2003/0112974 | A1 | 6/2003 | Levy | |
| 2004/0098603 | A1* | 5/2004 | Corinne | H04N 5/783 713/193 |
| 2005/0069171 | A1* | 3/2005 | Rhoads | G06Q 30/02 382/100 |
| 2005/0226421 | A1* | 10/2005 | Briancon | H04L 63/12 380/270 |
| 2006/0277410 | A1* | 12/2006 | Jajodia | G06T 1/005 713/176 |
| 2007/0033408 | A1* | 2/2007 | Morten | H04L 63/1408 713/176 |
| 2008/0134345 | A1* | 6/2008 | Epstein | H04N 5/913 726/28 |
| 2008/0219643 | A1 | 9/2008 | Le Buhan et al. | |
| 2009/0204808 | A1* | 8/2009 | Guo | G06F 21/33 713/155 |
| 2010/0040228 | A1 | 2/2010 | Lecomte et al. | |
| 2010/0128871 | A1 | 5/2010 | Folea et al. | |
| 2010/0208891 | A1* | 8/2010 | Folea | H04N 7/1675 380/205 |
| 2011/0293092 | A1 | 12/2011 | Tran et al. | |
| 2012/0076295 | A1* | 3/2012 | Brundage | G06T 1/0071 380/46 |
| 2012/0148089 | A1* | 6/2012 | Vashistha | G06T 1/005 382/100 |
| 2013/0148843 | A1* | 6/2013 | Doerr | G06T 1/0021 382/100 |
| 2013/0151856 | A1* | 6/2013 | Petrovic | H04N 1/00846 713/176 |
| 2013/0301872 | A1* | 11/2013 | Flaharty | H04N 5/913 382/100 |

FOREIGN PATENT DOCUMENTS

EP 2391125 A1 11/2011
WO WO-2012143880 A1 10/2012

OTHER PUBLICATIONS

European Patent Search Report for EP12199137.6 dated Sep. 5, 2013.

\* cited by examiner

METHOD TO ENFORCE WATERMARKING INSTRUCTIONS IN A RECEIVING DEVICE

This application claims priority under 35 U.S.C. §119 to U.S. application No. 61/740,480 filed on Dec. 21, 2012, and also claims priority under 35 U.S.C. §119 to European Patent Application No. 12199137.6 filed on Dec. 21, 2012. The entire disclosure of each of the above-referenced applications is hereby incorporated by reference.

INTRODUCTION

The present invention concerns the field of watermarking audio/video data in a receiving device.

BACKGROUND ART

Watermarking is a common technique to mark the data processed by a receiving device. It is a way to trace the content if the latter is found on Internet for example, without protection.

Various solutions exist to embed a watermark in an audio/video content once said audio/video content is descrambled. A first approach is to embed the watermark at the emission side. This is described in the document EP 2 204 979. The server fingerprints the data and the receiver can extract this fingerprint for authentication. Another approach is the one proposed by the document US 2010/0040228 in which once the video stream is descrambled, the receiving device add a mark specific to an identification of the receiving device.

A receiving device has, for example, the form of a set-top-box, an advance television or a CAM (conditional access module) in charge of receiving the audio/video stream and removing the protection layer. For that purpose, the receiving device comprises at least a descrambler (which receives a key) and a decoder. The decoder is in charge of transforming the compressed format of the audio/video stream into a format suitable for the display device.

The receiving device can also comprise a watermarking module which watermarks the data outputted from the descrambler module or the audio/video decoder, this watermark being parameterized by an internal parameter of the receiving device.

The receiving device comprises generally a security module to handle all the security operations. A security module can be a removable module such as a smartcard or a USB dongle, or embedded in the receiving device in the form of a single chip mounted on the circuit board or a mixed of them

BRIEF DESCRIPTION OF THE INVENTION

Once the audio/video data is descrambled, the content can be extracted and the watermark module skipped. The problem to be solved by the present invention is to enforce the watermarking step in a receiving device.

Accordingly, the present invention proposes a method to enforce watermarking instructions by a security module in a receiving device, said receiving device further comprising a descrambling module for descrambling scrambled audio/video data with at least a content key, and a watermarking module to embed a watermark into the descrambled audio/video data based on a watermarking data, said method comprising the steps of:

receiving a security message by the security module, comprising at least the content key, watermark instructions and security message signature, said watermark instruction activates or deactivates the watermarking module, decrypting the security message with a transmission key, verifying the security message signature, and in case of successful verification, reading the watermarking data from the watermarking module, verifying the authenticity of the watermarking data, and in case of successful verification, transmitting the watermark instructions to the watermark module and the content key to the descrambling module.

The aim of the present invention is to propose a receiving device in which the watermark module is under the control of the security module. This is why the message containing the content key also contains the watermark instruction. The security module is in charge of the processing of the content key as well as the watermark instruction.

The watermark instruction can be a single bit to switch on or off to activate or deactivate the watermark module, or a more complex command including a watermark data to embed into the audio/video content.

BRIEF DESCRIPTION OF THE DRAWINGS

The invention will be better understood thanks to the attached figures in which:

the FIG. 1 describes the different elements participating to the invention.

Figure 2:
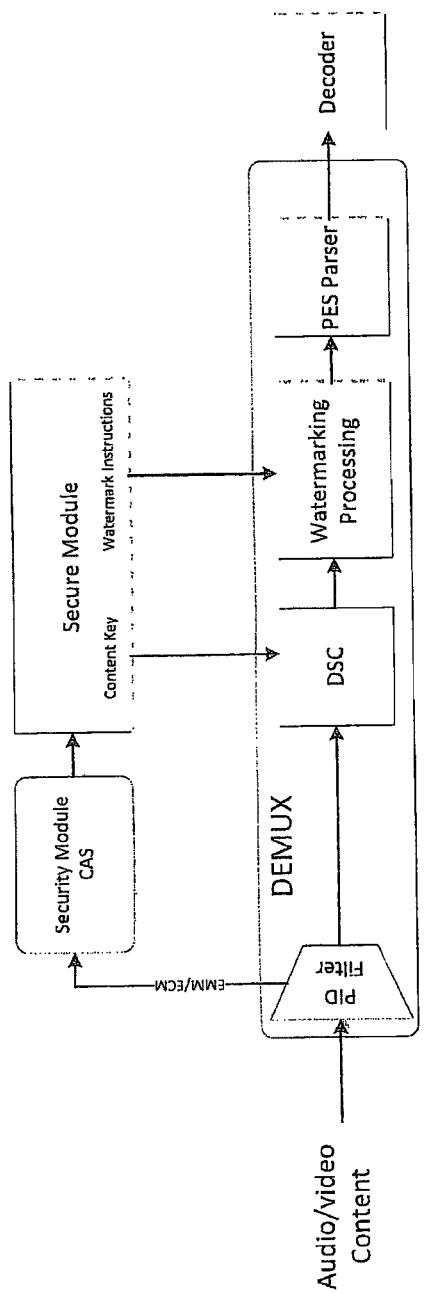
Figure 3:
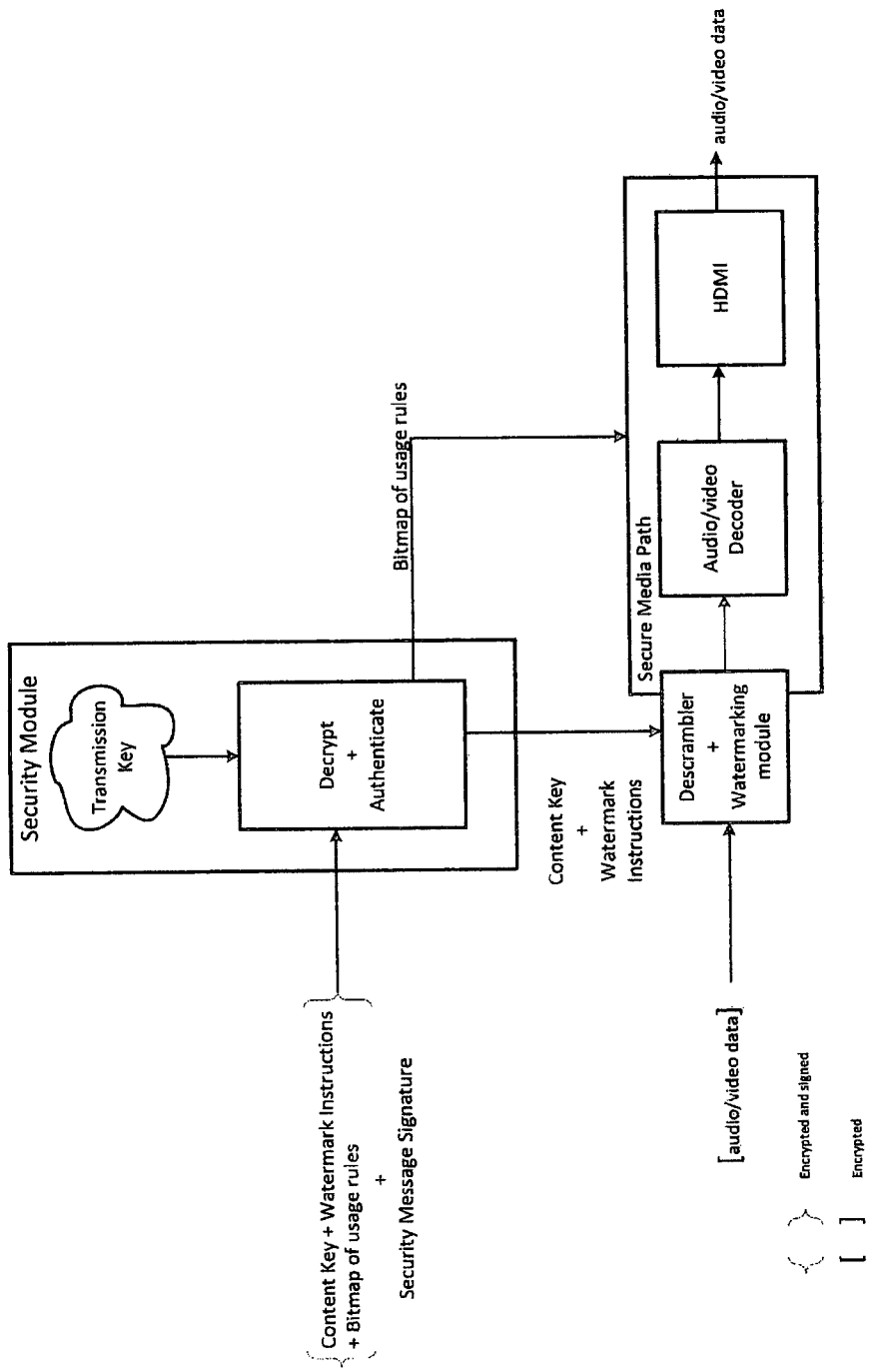
Figure 4:
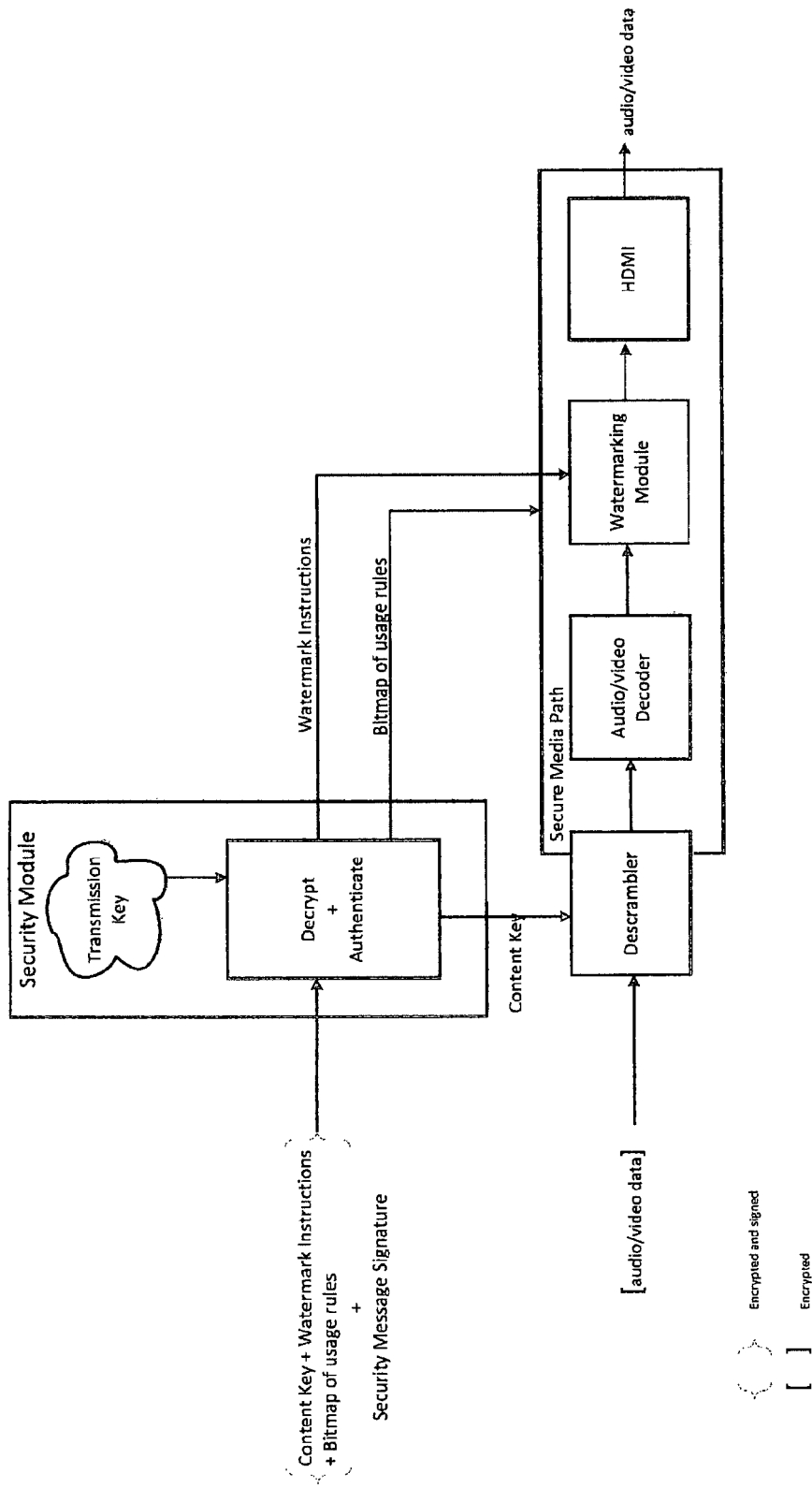
Figure 5:
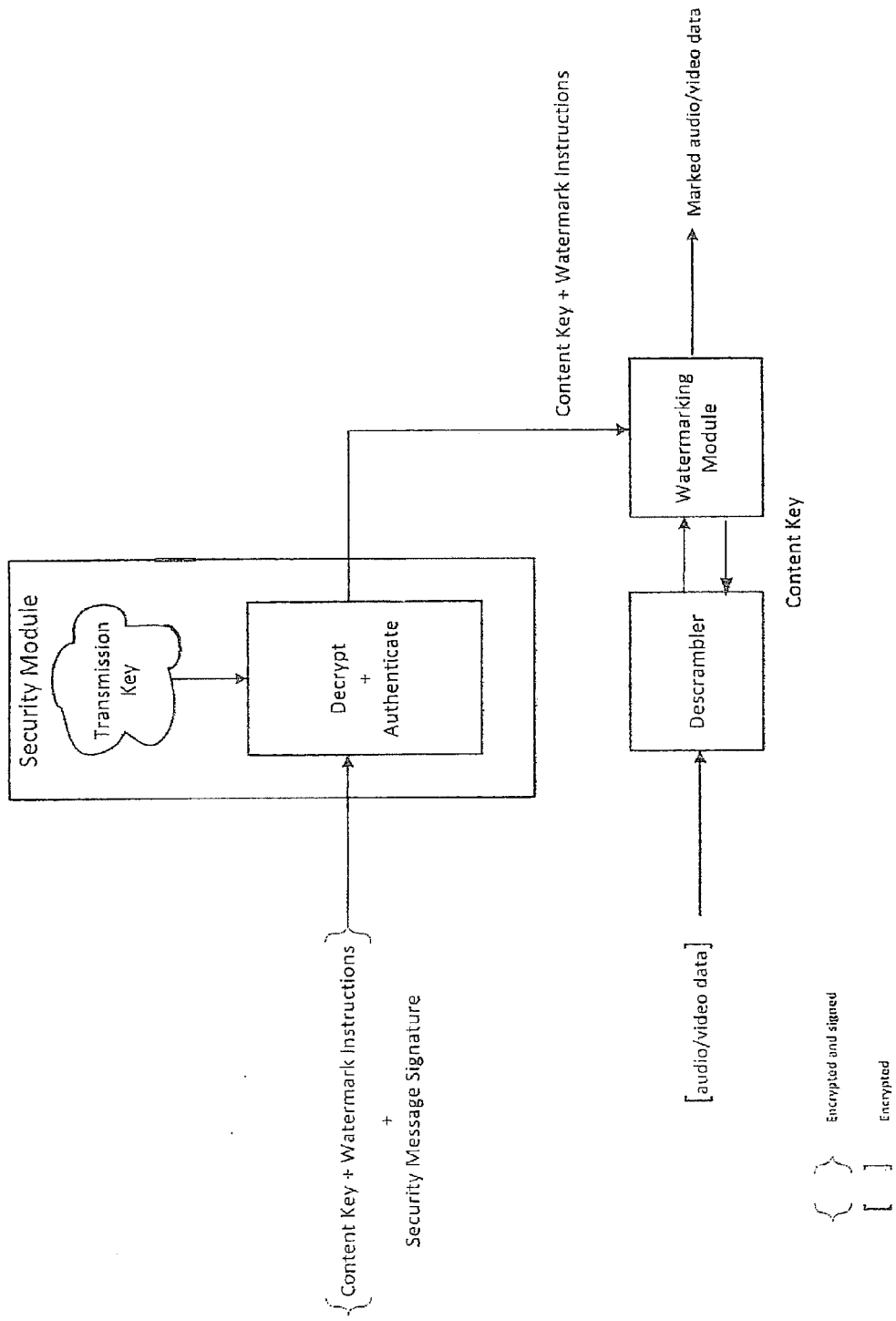

the FIG. 2 shows the architecture of a receiving device.

the FIG. 3 illustrates another embodiment in which the usage control is extended up to the audio/video data output of the device.

the FIG. 4 illustrates the embodiment in which the output of the descrambler is first passed to a decoder before being marked.

the FIG. 5 illustrates the embodiment with the patch for the CW through the descrambler.

DETAILED DESCRIPTION OF THE INVENTION

An audio/video content is encrypted (or scrambled) in order to limit the access and to control the use of it. The scrambling can be achieved thanks to one content key or a plurality of content keys, each being used for a portion of the content. It is to be noted that the content key can be also giving access to a plurality of contents, i.e. a television channel.

The content key (or keys) is transmitted to the receiving device encapsulated in a security message along with the access conditions and watermark instruction. The management center, in charge of preparing the message, retrieves the content key that was used to scramble the content and retrieves the watermark status as decided by the content's representative. The watermark status (e.g. enabled with ID of the content owner or a time stamp) is then converted into a watermark instruction. In our case, the watermark instruction will contain a flag to activate the watermark module in order to mark the descrambled content with the identification as determined by the watermarking data. The watermarking instruction is different than the watermarking data. The first one is the activation respectively deactivation of the module and the second one is the mark (or identification) that should be embedded into the output of the descrambler.

This message also contains a signature to verify its authenticity. A signature is a data element linked with the data to be authenticated. According to an example, the data to be authenticated is at least the watermark instruction and the content key. The data element is a signature of these elements. This can be achieved thanks to the encryption of a hash of the watermark instruction and the content key by an authentication key, the result being the security message signature.

The authentication key can be a symmetric secret key, stored in the management center and the security module of the receiving device. It can be an asymmetric key (generally the private key of the management center) and the security module has access to the corresponding public key.

According to a preferred embodiment, not only the watermark instruction is signed, but the combination of the content key and the watermark instruction. The same signature mechanism as explained above can be used. The signature being used to authenticate both the content key and the watermark instruction, this has the consequence that these two data are linked and cannot be used individually. It is therefore not possible to extract the watermark instruction with its signature to use them with another content key.

Once the signature is generated, the data elements cannot be modified without the recalculation of the signature. This is to avoid that a third party intercepts the message and changes for example the watermark instruction.

Once the message with the content key, the watermark instruction and the signature is ready, this message is encrypted by a transmission key to protect the access to the content key in particular. The transmission key to encrypt the message can be a key specific for the targeted receiving device, a key pertaining to the broadcast system (i.e. loaded in all authorized receiving device) or a group key, i.e. loaded in a group of receiving devices.

Figure 1:
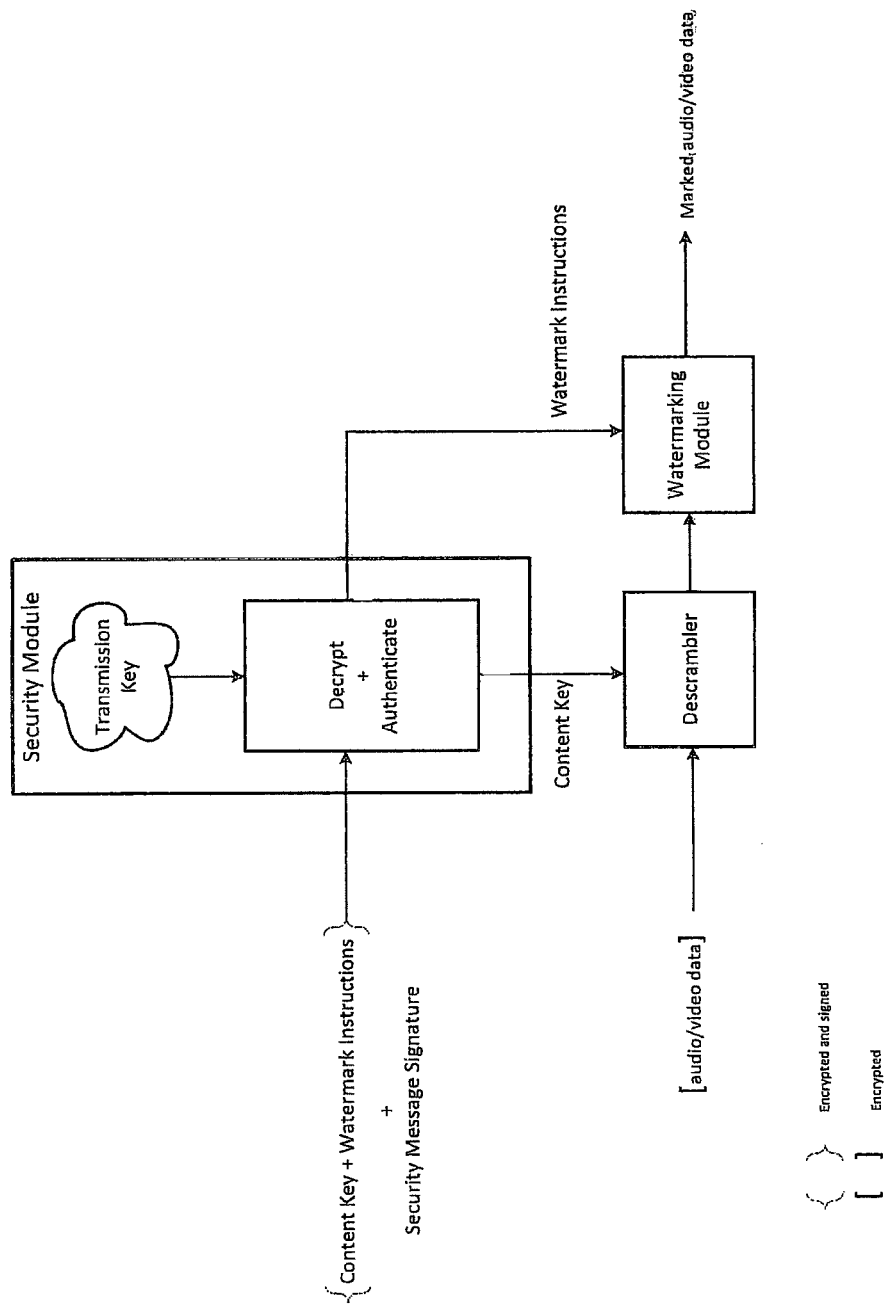

The receiving device is illustrated in the FIGS. 1 and 2. As explained above, the receiving device comprises a security module which at least handles the security messages. This message is received by the receiving device and passed to the security module. The latter, thanks to the transmission key, decrypts the message and has access to the content key, the watermark instruction and the signature.

The security module will now verify the signature. For that purpose, the security module comprises an authentication key to verify the signature. For example, the signature could be decrypted using the authentication key and the result of the decryption is compared with the hash of the security message data.

In the case that the signature was generated with the content key and the watermark instruction, the result of the decryption is compared with the hash value of these two elements. The generation of signatures is usually based on the hash value of the reference value(s). As a consequence, the verification made by the security module could be for example as follows:
  decrypting the signature with the authentication key,
  calculating a hash value of the data element to be authenticated (i.e. the watermark instruction, or the watermark instruction and the content key)
  comparing the calculated hash value with the decrypted signature, if both elements are identical, the signature is successfully authenticated.

Once the security module has successfully verified the signature, it can load the content key into the descrambler of the receiving module and the watermark instruction into the watermark module as illustrated in the FIG. 1.

According to another embodiment, the security module, before loading the content key into the descrambling module, reads the watermarking data from the watermarking module. The watermarking module can receive the watermarking data from another source without passing through the security module such as the receiving device, or by extracting the watermarking data from the received data. The fact that the security module simply instructs the watermarking module to embed a mark into the descrambled content does not guarantee that a mark will be embedded if the watermarking module has not received the watermarking data. This is why, prior to send the content key to the watermarking module, the security module verifies that the watermarking data has been duly loaded into this module.

The mere fact that some watermarking data are present into the watermarking module does not prove that these data are genuine. For that purpose the watermarking data comprises characteristics allowing to extract a pattern that can be authenticated by the security module. As a general definition, the expected pattern can be any characteristic of the watermarking data allowing to detect that, even though the range of values can be very large, that the structure of the watermarking data follows some predefined rules known be the entity defining the watermarking data and the security module. Examples are numerous and can be that the number of 1 is equal to the number of 0, or the last (or first, or at some place in the value) four bits are equal to 0101, or the last 5 bits are the hash value of the remaining bits.

The verification of the predefined rules allows to detect an authentic watermarking data.

According to a second embodiment, the verification of the watermarking data is postponed. The content key, after the successful verification of the signature in the security message, is transferred to the descrambler and the watermark instruction is loaded into the watermarking module. The security module then starts a timer with a predefined duration and waits the completion of this duration. The predefined duration can be one of the parameter of the security message or already defined into the security module, at an initialization step of the security module or set during a previous reception of a configuration message.

When the duration is over, the security module questions the watermarking module to obtain the watermarking data. The verification of the watermarking data is carried out in the same manner as described above. In case of unsuccessful verification, the security module blocks the further transmission of the subsequent content key. Since the content key changes on a regular basis, the first content key is passed to the descrambling module at the time the watermark instruction is passed to the watermarking module. If the verification of the watermark data, carried out at a later stage, has not confirmed that the watermarking data are authentic, the subsequently received content key (contained in subsequent security messages) are not passed to the descrambling module. Since we have now introduce the notion of first content key, initiating the timer and subsequent content keys, the definition of the first content key can associated with a channel change (the first security message received after the receiving unit has tune to another channel, or can be defined by a suitable bit in the security message.

The third embodiment is similar to the previous one with the modification that the verification of the watermarking data is not triggered by a timer but by the reception of a new security message. At that time, the security module is supposed to pass the new content key to the descrambling module. Before doing it, the security module verifies the watermarking data in the way described above.

This delayed verification is the consequence of the fact that, in some cases, watermarking data can be embedded on the data received by the descrambling module. The descrambling module should first descramble the received content to extract the watermarking data which are then loaded into the watermarking module. This is why the method of the present invention should allow the descrambling module to work without the presence of the watermarking data. However, this situation can only be temporary and the verification is postponed by a timer (second embodiment) or while the security module receives the subsequent content key (third embodiment).

In the FIG. 2, the receiving device is illustrated with the input filter PID filter in charge of extracting the sub-streams constituting a service (video pid, audio pid, data pid). Part of the data pid is extracted and forwarded to the security module. The example illustrated is based on broadcast television with control word as content key. A security message, called Entitlement Control Message (ECM) comprises two control words, the current control word and the next control word. The Security module CAS is a communication and handling software module in charge of interacting with the Security Module. It should for example filter the messages that are not directed to the security module connected to it.

The security operations as explained above are executed on the security message. The ECM can contain more than one signature, for example a signature for the access conditions and another one for the control words. The access conditions are the conditions that the security module should meet in order to the control word to be returned to the descrambler. It can be for example in the form of a right for a given channel or bouquet. The security message contains the access conditions such as a right description (i.e. R23) and the security module will check if the right R23 is present in its secure memory. In the negative event, the control word is not returned to the descrambler.

The watermark module can be inserted in the compressed or uncompressed audio/video data path. For example, in the FIGS. 1, 2 and 3, the watermark module is placed in the path of the compressed audio/video data.

Once the verification is successful, the content key is transferred to the descrambler and the watermark instruction to the watermark module. It is to be noted that in a particular embodiment, the descrambler and the watermark module are located into the same chip. A single command can be used to load the content key and the watermark instruction.

The watermark instruction is primarily a command to activate or deactivate the watermarking module. This instruction can further comprise the watermarking data to be embedded into the descrambled stream. This watermarking data can be a value contained in the security message originating from the management center or a local value stored in the security module or in the receiving device. Said watermarking data aims at embedding a mark into the audio or video data representative of this data.

The link between the security module and the descrambler module, as well as the watermark module can be secured by a key. The message containing the content key and the watermark instruction is encrypted by a key specific to the descrambler module/watermark module.

According to a particular embodiment, the descrambler module and the watermark module are located into the same silicon chip. As a consequence, the single command from the security module will load simultaneously the content key and the watermark instruction. In case that the watermark instruction is not correctly authenticated the command is refused and the content key not loaded. Therefore the content is not decrypted.

According to one embodiment, the security messages are Entitlement Control message (ECM) containing two control words as content key.

According to one embodiment, the security message is a DRM license. This license is preferably encrypted by a key specific for the targeted security module. Embodiments of the present invention will work equally well for content protected by Digital Rights Management (DRM) schemes comprised in the state of the art. In this case, the security message is called "license". No particular right or data have to be previously stored into the receiving device to authorize the content key to loaded into the descrambler.

The FIG. 3 illustrates an extension of the control of the usage rule. The security message can comprise further usage rules to define how the descrambled content can be used. The message comprises usage rules, for example in the form of a bitmap. Each bit of the bitmap can define one output such as HDMI, USB, DVI. When the bit is set, the corresponding output is enabled. When the bit is not set, the corresponding output is disabled for this particular content being decrypted by its associated content key. The bitmap can also comprise bits to define the further treatment of the content such as such the storage or the transmission via Wifi.

In a preferred embodiment, the usage rules are authenticated by the security message signature. The security message signature (as illustrated in the FIG. 3) is thus generated on the basis of the watermark instruction, the content key and the usage rules.

The bitmap (in the same manner as the content key or the watermark instruction) is transferred from the security module to the Secure Media Path (SMP) through a secure channel. One example of a secure channel is a direct hardware connection. Another example is the use of trusted environment to load the bitmap into the SMP.

The FIG. 4 illustrates a case in which the watermark is applied on the decompressed data. The output of the descrambler is first passed to a decoder to produce the decompressed audio/video data. These audio/video data (or part of them for example the video or the audio) is marked by the watermark module.

The FIG. 5 is an alternate embodiment in which the only way to load the control words into the descrambler is through the watermarking module. The descrambler module has no connection with the security module and the manner to load the control word into the descrambler is to first load the watermark instruction together with the control word into the descrambler and the descrambler extract from the message the control word (or control words) and transmit the control word into the descrambler. This is a manner to ensure that the watermarking module has to be updated with the latest watermark instruction before the descrambler can receives the control word.

The invention claimed is:

1. Method to enforce watermarking instructions by a security module in a receiving device, said receiving device further comprising a descrambling module for descrambling scrambled audio/video data with at least a content key, and a watermarking module to embed a watermark into the descrambled audio/video data based on a watermarking data, said method comprising:
   receiving a security message by the security module, comprising at least the content key, watermark instructions and security message signature, the security message signature being a signature of the watermark instructions and the content key based on an authentication key, said watermark instructions indicating whether to activate or deactivate the watermarking module,
   decrypting the security message with a transmission key, and
   verifying the security message signature with the authentication key, and in case of successful verification,
      reading the watermarking data by the watermarking module, and verifying the authenticity of the watermarking data, and in case of successful verification, transmitting the watermark instructions to the watermark module and the content key to the descrambling module, wherein the descrambler module has no direct connection with the security module and the transmission of the content key is loaded into the descrambler by loading the watermark instructions and the content key into the watermarking module, the latter transmitting the content key to the descrambler module, and wherein the security module, the descrambler module, and the watermarking module are implemented by one or more microprocessors.

2. Method to enforce watermarking instructions by a security module in a receiving device, said receiving device further comprising a descrambling module for descrambling scrambled audio/video data with at least a content key, and a watermarking module to embed a watermark into the descrambled audio/video data based on a watermarking data, said method comprising:

receiving a security message by the security module, comprising at least the content key, watermark instructions and security message signature, the security message signature being a signature of the watermark instructions and the content key based on an authentication key, said watermark instructions indicating whether to activate or deactivate the watermarking module, decrypting the security message with a transmission key, and verifying the security message signature with the authentication key, and in case of successful verification, transmitting the watermark instructions to the watermark module and the content key to the descrambling module, and in case the watermark instructions indicate to activate the watermarking module, loading a timer with a predefined duration, and at the completion of the duration, reading the watermarking data from the watermarking module, and verifying the authenticity of the watermarking data, and in case of unsuccessful verification, blocking further transmission of the content key to the descrambling module, wherein the descrambler module has no direct connection with the security module and the transmission of the content key is loaded into the descrambler by loading the watermark instructions and the content key into the watermarking module, the latter transmitting the content key to the descrambler module, and wherein the security module, the descrambler module, and the watermarking module are implemented by one or more microprocessors.

3. Method to enforce watermarking instructions by a security module in a receiving device, said receiving device further comprising a descrambling module for descrambling scrambled audio/video data with at least a content key, and a watermarking module to embed a watermark into the descrambled audio/video data based on a watermarking data, said method comprising:

receiving a security message by the security module, comprising at least the content key, watermark instructions and security message signature, the security message signature being a signature of the watermark instructions and the content key based on an authentication key, said watermark instructions indicating whether to activate or deactivate the watermarking module, decrypting the security message with a transmission key, and verifying the security message signature with the authentication key, and in case of successful verification, transmitting the watermark instructions to the watermark module and the content key to the descrambling module, and in case the watermark instructions indicate to activate the watermarking module, receiving a subsequent security message and decrypting the subsequent security message with a transmission key to extract a subsequent content key, reading the watermarking data from the watermarking module, and verifying the authenticity of the watermarking data, and in case of unsuccessful verification, blocking transmission of the subsequent content key to the descrambling module, wherein the descrambler module has no direct connection with the security module and the transmission of the content key is loaded into the descrambler by loading the watermark instructions and the content key into the watermarking module, the latter transmitting the content key to the descrambler module, and wherein the security module, the descrambler module, and the watermarking module are implemented by one or more microprocessors.

4. Method of claim 1, wherein the verification of the watermarking data comprises calculating a signature on the watermarking data and verifying the calculated signature.

5. Method of claim 1, wherein the watermark instructions further comprises the watermarking data, said watermarking data being used by the watermark module to embed a mark representative of the watermarking data.

6. Method of claim 1, wherein the security module comprises a security module identification, said security module identification being used as the watermarking data by the watermark module to embed a mark representative of the security module identification.

7. Method of claim 1, further comprising:

calculating a digest based on the watermark instructions and the authentication key, comparing the calculated digest with the watermark instructions to determine if the watermark instructions are authentic.

8. Method of claim 1, wherein the security module comprises the transmission key to decrypt the security message before processing the security message.

9. Method of claim 1, wherein the security message is an Entitlement Control Message (ECM).

10. Method of claim 1, wherein the security message is a Digital Rights Management (DRM) message or certificate.

11. Method of claim 1, wherein the security message further comprises usage rules defining the usage of the descrambled and watermarked content, said usage rules being authenticated with said security message signature.

12. Secure chipset, comprising:

at least a descrambling module for descrambling encrypted audio/video data with at least a content key, and a watermarking module configured to embed a watermark into the descrambled audio/video data based on watermarking data and a security module, said security module being configured to receive a security message comprising at least the content key, watermark instructions and security message signature, the security message signature being a signature of the watermark instructions and the content key based on an authentication key, said watermark instructions indicating whether to activate or deactivate the watermarking module,
said security module being configured,
- to extract the content key from the security message,
- to verify the security message signature with the authentication key and in case of successful verification,
- to verify that the watermarking module has duly received watermarking data, and in the positive case, to pass the content key to the descrambling module and the watermark instructions to the watermark module, wherein the descrambler module has no direct connection with the security module, the security module is configured to pass the content key and the watermark instructions to the watermarking module, and said watermarking module is configured to pass the content key to the descrambler module.

* * * * *